United States Patent [19]
Betrix

[11] 3,879,093
[45] Apr. 22, 1975

[54] AXIAL GUIDING APPARATUS

[76] Inventor: Claude Betrix, Rue Rugin 23, 2034 Peseux, Switzerland

[22] Filed: June 18, 1973

[21] Appl. No.: 370,727

[30] Foreign Application Priority Data
June 20, 1972 Switzerland.......................... 9245/72

[52] U.S. Cl................................................ 308/6 C
[51] Int. Cl. ............................................ F16c 29/06
[58] Field of Search ..................................... 308/6 C

[56] References Cited
UNITED STATES PATENTS
3,545,826   12/1970   Magee et al. ...................... 308/6 C Primary Examiner—M. Henson Wood, Jr.
Assistant Examiner—Robert Saifer
Attorney, Agent, or Firm—Robert E. Burns; Emmanuel J. Lobato; Bruce L. Adams

[57] ABSTRACT

An apparatus for guiding the axial displacement of a cylindrical member comprises a bush in which the member is guided by means of several series of balls, each of which forms a closed circuit and comprises a rectilinear row of balls in rolling contact with the guided member. The series of balls are guided in guide races by means of a cage arranged in the bush and comprising, for each series of balls, a rectilinear slot in which the balls of the rectilinear row roll, a groove parallel to the slot and defined by the outer side of the cage, and two incurved ramps connecting the corresponding ends of the slot and groove. The cage is constituted by a tubular socket in a single piece with a solid wall in which are provided the slots, grooves and ramps. The bush is tubular and cylindrical and is constituted by a hard injected or moulded material in which are embedded parts projecting inside the bush, these parts serving as a race for the balls in rolling contact with the guided member.

1 Claim, 5 Drawing Figures

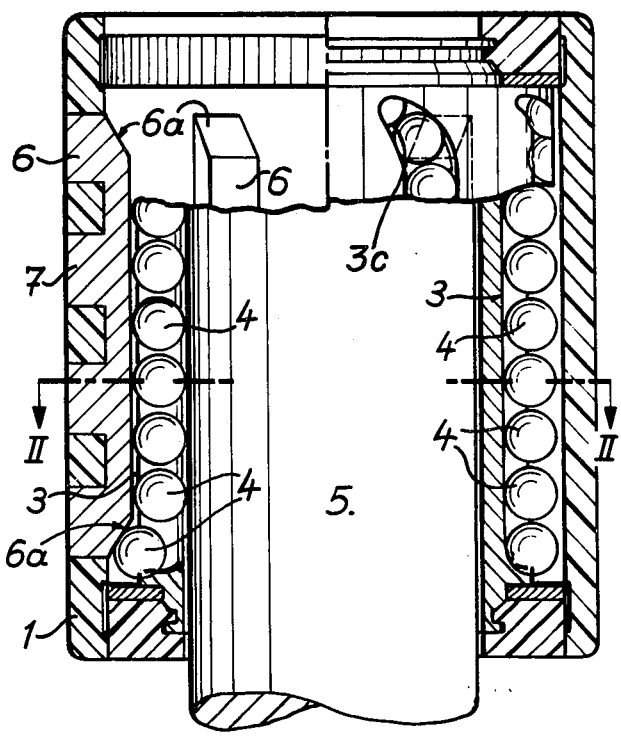
FIG. 4   FIG. 1
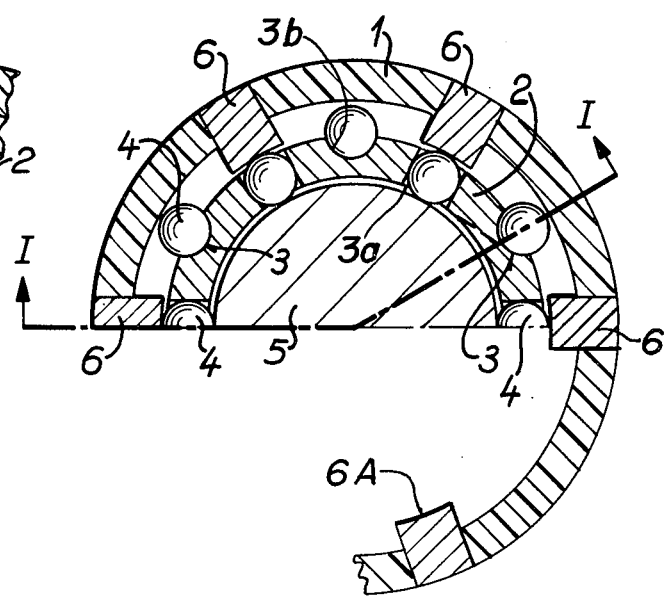
FIG. 5
FIG. 3   FIG. 2

AXIAL GUIDING APPARATUS

This invention relates to apparatus for guiding the axial displacement of a cylindrical member, the apparatus comprising a bush in which the member is guided by means of several series of balls, each of which forms a closed circuit and comprises a rectilinear row of balls in rolling contact with the guided member, the series of balls being guided in guide races formed by means of a cage arranged in the bush and comprising for each series of balls, a rectilinear slot in which the balls of the rectilinear row roll, a groove parallel to the slot and defined by the outer side of the cage and two incurved ramps connecting the corresponding ends of the slot and groove, this cage being constituted by a tubular socket in a single piece with a solid wall in which are provided slots, grooves and ramps.

In known apparatus, the bush is constituted by a single metal part in which are provided cut-outs for the passage of the balls which are not in rolling contact with the guided member. These unitary bushes are complicated and difficult to manufacture.

An object of the invention is to provide a guide apparatus which is particularly simple to construct and economical to manufacture.

This apparatus is characterised by the fact that said bush is tubular and cylindrical and is constituted by a hard, injected or moulded material and in which are embedded parts projecting inside said bush, these parts serving as a race for the balls in rolling contact with the guided member.

Embodiments of the present invention will now be described by way of example, with reference to the accompanying drawing, in which:

FIG. 1 is a fragmentary axial section on the line I—I of FIG. 2;

FIG. 2 is a transverse section on the line II—II of FIG. 1;

FIG. 3 is a transverse section on the line III—III of FIG. 4 which is another embodiment;

FIG. 4 is a section on the line IV—IV of FIG. 3; and,

FIG. 5 is a transverse section of yet another embodiment.

The guiding apparatus illustrated in FIGS. 1 and 2 comprises a bush 1 of hard injected material, inside which is housed a tubular cage 2 in which are cut six roller-tracks 3 for a corresponding number of series of balls 4, in contact with which the cylindrical member 5 moves during its axial movement. The tracks 3, as already noted, include slots 3a and grooves 3b, both parallel to the axis of the apparatus, and ramps 3c at both ends of the cage, between the slots and the grooves.

This bush 1 is tubular and cylindrical, its wall has a substantially constant thickness, and it is made of hard material, for example of polyvenylchloride, or injected metal. Embedded in this bush 1 are parts 6 projecting inside the bush. These parts 6 of rectangular section serve as races for the balls 4 in contact with the guided cylindrical member 5.

These parts 6 have studs 7 for anchoring them in the injected or moulded bush material. The ends of the studs 7 are flush with the outer surface of the bush 1 and, in fact, serve as supports when the guiding apparatus is driven into the hole intended for it, in the machine or apparatus in which it is to be mounted. The ends of the studs 7 come into close contact with the surface of this hole and there is no danger of any displacement of the parts 6, the precision of the apparatus thus being fully retained under load.

The ends of the parts 6 each have an inclined face or flat part 6a allowing the balls 4 to enter the groove of the track 3.

In the embodiment illustrated in FIGS. 3 and 4, the parts 6 are formed by cylindrical pins 6 embedded in the plastics material of the bush 1. They are terminated by conical frustums. These pins have the same functions as the parts 6 described in FIGS. 1 and 2.

The balls 3 in contact with the cylindrical member 5 roll on a generatrix of the cylinder, the frustoconical end of the pin allowing the balls 4 to enter the groove of the track 3. The generatrix diametrically opposed to the generatrix in contact with the balls is flush with the outer face of the bush 1.

In the embodiment of FIG. 5, each part 6 is replaced by a pair of pins 6' located to tangentially contact one another. These pins 6' function as parts 6 and cylindrical pins 6, the race for the balls 4 being constituted by the two generatrices of the pins tangential to the balls 4.

The pins 6' are also terminated by conical parts allowing the balls 4 to enter the groove of the track 3. The pins 6' are embedded in the material of the sleeve.

In modifications which are not shown, the parts 6 could have other shapes: for example hexagonal or prismatic. In a modification of the first embodiment which is schematically shown in FIG. 2 at 6a, it is also possible to provide that the rolling surfaces of the parts 6 are slightly incurved with respect to the rolling axis of the balls. In this manner, by rotation of the cage 2, it is easy to adjust the clearance of these balls between the rolling surfaces and the body of the guided member respectively. Such adjustment is also possible in accordance with FIG. 3, as will be noted by reference to curved surface 6b.

It will be seen from the above description that this apparatus is very simple to construct and is economical, in fact the parts 6, 6a, 6b are easy to machine and are inexpensive and the moulding or injection of the bushes with the parts retained therein is very easy to carry out. The strength of apparatus produced in this way is similar to that of apparatus using a known machined bush.

What is claimed is:

1. Apparatus for guiding axial displacement of a cylindrical member, the apparatus comprising a bush, several series of bearing means for guiding the member in the bush, each series forming a closed circuit and comprising a rectilinear row of balls in rolling contact with the cylindrical member; cage means located in the bush for guiding the several series of bearing means in guide races and having, for each series of bearing means and for allowing the balls of the respective rectilinear row to roll, a rectilinear slot in the cage means, a groove parallel to the slot and defined by the outer side of the cage means and two incurved ramps connecting the corresponding ends of the slot and groove; the cage means being constituted by a tubular socket with a solid wall in which the slots and grooves are provided; the bush being tubular and cylindrical and being constituted by a hard material and in which are embedded means, projecting inside the bush, for providing said races for the balls in rolling contact with the guided member, and said races being curved with respect to the rolling axis of the balls in order to be able to adjust the clearance of the balls by rotating the tubular socket.

* * * * *